United States Patent
Emnett

[19]

[11] Patent Number: 5,996,037
[45] Date of Patent: Nov. 30, 1999

[54] SYSTEM AND METHOD FOR ARBITRATING MULTI-FUNCTION ACCESS TO A SYSTEM BUS

[75] Inventor: Raymond F. Emnett, Newberg, Oreg.

[73] Assignee: LSI Logic Corporation, Milpatas, Calif.

[21] Appl. No.: 08/867,992

[22] Filed: Jun. 3, 1997

[51] Int. Cl.[6] .................................................. G06F 13/14
[52] U.S. Cl. ............................................. 710/117; 710/45
[58] Field of Search .................................. 395/297, 304, 395/861; 370/444, 508; 710/35, 117, 124, 41, 45, 116, 123

[56] References Cited

U.S. PATENT DOCUMENTS

| | | | |
|---|---|---|---|
| 4,473,880 | 9/1984 | Budde et al. | 364/200 |
| 4,719,569 | 1/1988 | Ludemann et al. | 364/200 |
| 4,953,081 | 8/1990 | Feal et al. | 364/200 |
| 5,088,024 | 2/1992 | Vernon et al. | 395/725 |
| 5,159,671 | 10/1992 | Iwami | 710/20 |
| 5,179,663 | 1/1993 | Iimura | 710/35 |
| 5,195,185 | 3/1993 | Marenin | 395/325 |
| 5,241,632 | 8/1993 | O'Connell et al. | 395/325 |
| 5,253,347 | 10/1993 | Bagnoli et al. | 395/293 |
| 5,388,228 | 2/1995 | Heath et al. | 395/325 |
| 5,469,577 | 11/1995 | Eng et al. | 395/290 |
| 5,515,523 | 5/1996 | Kalkunte et al. | 711/149 |
| 5,590,299 | 12/1996 | Bennett | 711/5 |
| 5,598,542 | 1/1997 | Leung | 395/297 |
| 5,740,380 | 4/1998 | LaBerge et al. | 395/287 |
| 5,761,445 | 7/1998 | Nguyen | 395/293 |
| 5,797,020 | 8/1998 | Bonella et al. | 395/728 |
| 5,826,101 | 10/1998 | Beck et al. | 712/34 |

*Primary Examiner*—Paul R. Myers

[57] ABSTRACT

A system arbitrator for a multi-function device is disclosed. The access arbitrator includes a bus access counter and comparator which are used to generate a bus request disable signal. The bus request disable signal for each function of the multi-function device is gated with the bus request signal for the function. As a function transfers data over the system bus, the access counter is incremented. When the access counter is incremented to a value which equals a predetermined maximum, the bus request disable signal becomes active and disables generation of bus requests for the function. In order to enable the bus signal generator for a function to begin generating bus requests, the access counters are reset when no bus request signals are being generated by any of the bus signal generators.

20 Claims, 3 Drawing Sheets

SYSTEM AND METHOD FOR ARBITRATING MULTI-FUNCTION ACCESS TO A SYSTEM BUS

BACKGROUND OF THE INVENTION

This invention relates to arbitration of access to a system bus, and more particularly, to arbitration between devices having different levels of access priority to the system bus.

In many personal computers (PCs), a motherboard is provided with an implementing integrated circuit ("chip") set. The devices or components of the implementing chip set are coupled to one another through a system bus. The motherboard is usually provided with a number of extension connectors so other devices or interfaces/bridges may be coupled to the system bus. For example, the peripheral component interconnect (PCI) bus is frequently used in PCs to couple an implementing chip set for a PC to the devices and interfaces/bridges which may be coupled to the expansion connectors. Devices, which may be coupled in an extension connector, include Ethernet interfaces, SCSI interfaces, Host/PCI bridges, PCI/Legacy bridges, video, sound, and E-IDE printed circuit cards.

A typical system using a PCI bus has two or three card connectors and two or three PCI loads on the motherboard. However, a PCI bus is limited to a maximum of ten electrical loads. For printed circuit cards coupled to a connector, the connector represents one load and the card represents a second load. As a result, the maximum load for a PCI bus may be reached before a user has coupled all of the components desired for a system. Another restriction which limits the number of devices which may be coupled to a system bus is the arbitration scheme used to control access to the system bus. For example, in some PCI bus systems, the number of bus masters used to control device access to the system bus is limited to four because that is the maximum number of request/grant (REQ#/GNT#) pairs that can be handled by the central bus arbiter.

In an effort to overcome the limitations of a system bus such as the maximum number of electrical loads and maximum number of bus masters, multi-function devices which couple more than one function to a single system bus have been developed. These devices represent the same number of electrical loads as a single function device; however, they provide more functions. Additionally, the multi-function device only requires one request/grant pair for all functions and thus, appears as a single bus master to the central arbiter of the system bus. In this type of system, the bus master arbitrates access for the request/grant pair between the functions.

In a PCI system, the central arbiter receives request signals from PCI devices or bus masters and determines which device or bus master receives a grant signal. In response to receipt of a grant signal, a PCI device sends or receives data over the system bus. Where a multiple function device is coupled to a PCI bus through a bus master, the bus master must arbitrate between the multiple functions which the bus master couples to the system bus. In previously known systems, contentions between multiple functions coupled to a single bus master are resolved by prioritizing the functions for system bus access. In this scheme, each function is assigned a numerical priority level, usually from 0–7, with zero being the lowest priority and 7 being the highest priority.

While the prioritizing of the system bus access requests from the various functions of a multi-function PCI device enables a bus master to resolve competing requests for system bus access, prioritization of the requests presents other issues. For example, a high priority function may dominate access to the system bus to the extent of completely or substantially excluding a lower priority function from bus access. In an effort to address this limitation, rotating prioritizing schemes have been developed. Typically, these arbitration schemes statistically evaluate the proportionate amount of time a device is being given access to the system bus and reduce the likelihood of one function blocking the other functions by changing the system access function priorities. The modification of the function priorities is typically performed on a periodic basis. As the priority for a function is increased, it is able to gain more access to the system bus and, consequently, receive and transmit data over the bus without contending with the same higher priority access requests.

While the rotating priority level addresses some aspects of the problem caused by static priority assignment, it still causes other system access problems. For example, system transmissions and receptions over a PCI bus are performed in burst mode. To complete a transmission or a reception, several bursts may be required. Thus, a device may be at the highest level of priority for system bus access for a portion of a transmission or reception and at a lower priority level for the remainder of the transmission or reception. Consequently, it may be some time before the device is able to acquire bus access from the higher priority functions to complete the transmission or reception.

What is needed is a system and method for system bus arbitration between multiple functions so that data transfers may be more timely completed.

SUMMARY OF THE INVENTION

The limitations of previously known systems and methods used for system bus arbitration between multiple functions are overcome by a system and method practiced in accordance with the principles of the present invention. The method of the present invention includes the steps of comparing a completed number of data transfers for a function to a predetermined maximum number of completed data transfers for the function, and generating a bus request disable signal in response to the completed number of data transfers for the function being equal to the predetermined maximum number of completed data transfers for the function. The bus request disable signal is used to disable generation of bus access requests for the function until the completed number of data transfers is reset to a number less than the predetermined maximum. Thus, once a function has accessed the system bus the predetermined maximum number of times, it can no longer request system bus access until all of the other remaining functions have also exhausted their predetermined maximum number of data transfers.

So the present invention does not unnecessarily slow system access by having disabled functions wait for a function that slowly reaches its predetermined maximum number, the completed number of data transfers is reset to a number less than the predetermined maximum in response to no active bus request signals being generated by the functions. Thus, as long as functions are actively trying to request system bus access, the arbitration method of the present invention limits the number of bus accesses for each function to the predetermined maximum number for each function. When no function is requesting access, the arbiter of the present invention resets the access counters to enable all functions for bus request generation.

In a preferred implementation of the present invention, the predetermined maximum number of data transfers for each function preferably differ from the predetermined maximum numbers for each of the other functions. Most preferably, the predetermined maximum number is correlated to a predetermined number of data bursts and the numerical priority level for the function. As a result, higher level priorities are serviced first and permitted to transfer more data without completely precluding other functions at lower priority levels from transferring data.

In the system of the present invention, a bus access counter for counting completed data transfers for a function is provided for each function coupled to a bus master. The output of the bus access counter is provided to a comparator which compares the data transfer count to a predetermined maximum number. Until the number of data transfers equals the predetermined maximum number, the comparator generates an inactive bus request disable signal. The inactive state of the bus request disable signal permits bus request signals for the function to be generated and provided to the bus master. The bus master, in response to receiving a bus request signal, generates a system bus request to the central arbiter for the system bus. In response to receiving a grant access signal from the central arbiter, the bus master provides a grant access signal to the function for which it generated the system bus request. After the function has completed a data transfer, the bus access counter for the function is incremented and compared to its predetermined maximum to determine whether the bus request disable signal goes to an active state. If it does, the function is disabled from generating bus request signals until its bus access counter is reset. This disabling of a function enables other functions to gain access to the system bus and transfer data.

With the system and method of the present invention, a bus master for a multi-function device can reduce the likelihood that a function completely blocks other functions from accessing the system bus. Furthermore, the system and method of the present invention may be used with a prioritized scheme to help ensure that all priority functions are granted access to the system bus. These and other advantages and benefits of the present invention may be ascertained from the detailed description of the invention and the accompanying drawings.

DETAILED DESCRIPTION OF THE DRAWINGS

DETAILED DESCRIPTION OF THE INVENTION

Figure 1:
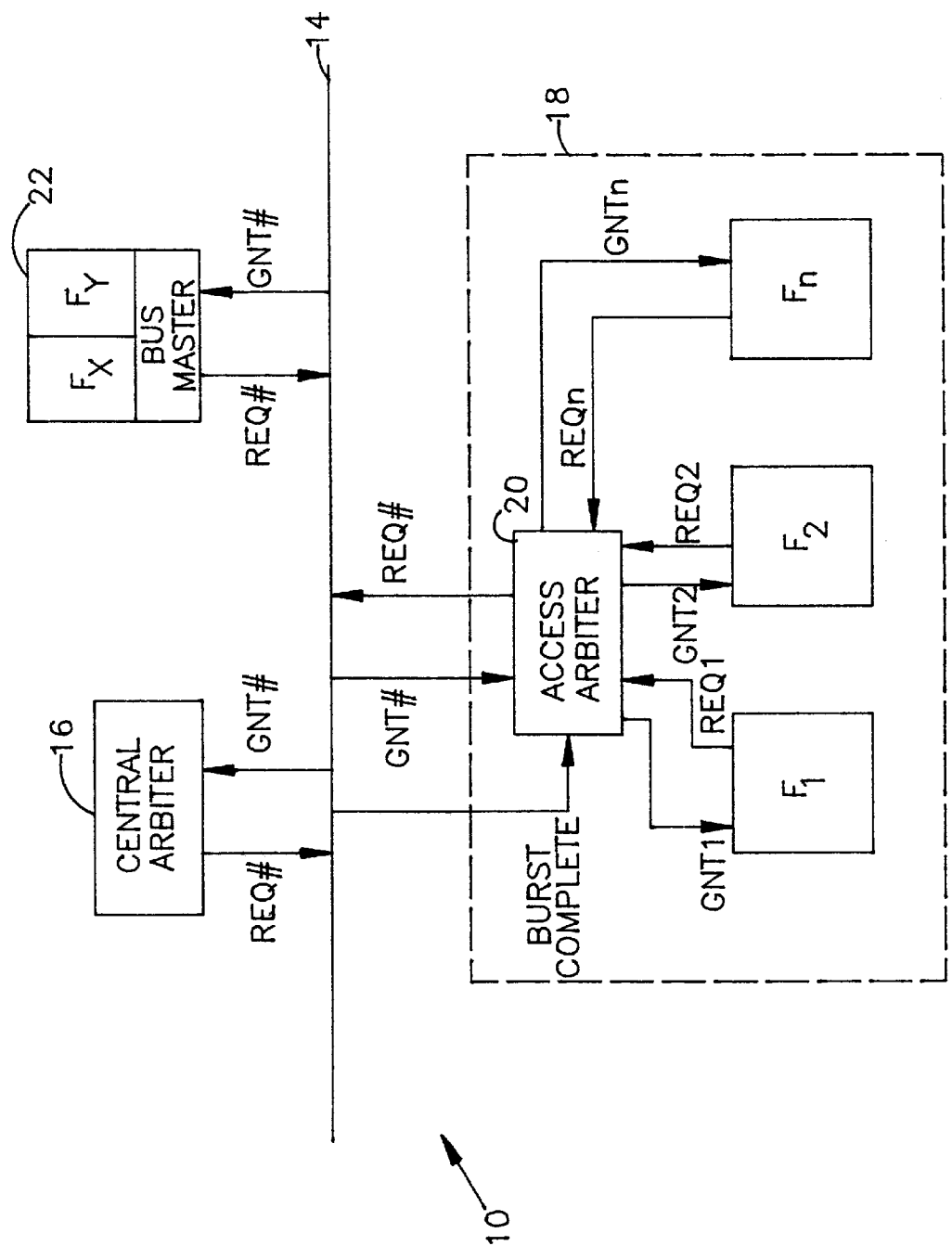
FIG. 1 is a block diagram of a system using the access arbiter of the present invention for a multi-function device.

A system which uses an access arbiter implementing the method of the present invention is shown in FIG. 1. System 10 includes a system bus 14 with central arbiter 16 and multi-function device 18 coupled thereto. Multi-function device 18 includes multiple functions $F_1$, $F_2$, ... $F_n$ which are all shown coupled with their request and grant lines to access arbiter 20. Central arbiter 16 is used to control access to system bus 14 from components or devices coupled to system bus 14. For example, multi-function device 22 may be a conventional multi-function device which uses a bus master and a time multiplexed or prioritized scheme to arbitrate between functions $F_x$ and $F_y$. Although a PCI multi-function device has been discussed as exemplary of the type of device which couples to access arbiter 20, other devices supporting more than one function may be used. Central arbiter 16 receives request signals from devices and components coupled to system bus 14 and determines which device or component is granted access to the bus in accordance with well known arbitration schemes.

Multi-function device 18 depicts access arbiter 20 being coupled to a plurality of functions $F_1$, ... $F_n$. The reader should appreciate that one or more of these functions may be a bus master for coupling additional functions (not shown) to access arbiter 20. Access arbiter 20 controls access to system bus 14 in cooperation with central arbiter 16. The data lines and other control signals which are selectively coupled between functions of multi-function device 18 and system bus 14 are not shown to simplify the reader's understanding of the present invention. As shown in FIG. 1, access arbiter 20 also preferably uses a burst_complete signal to indicate a completed data transfer for one of the functions $F_1$. . . $F_n$ over system bus 14.

Figure 2:
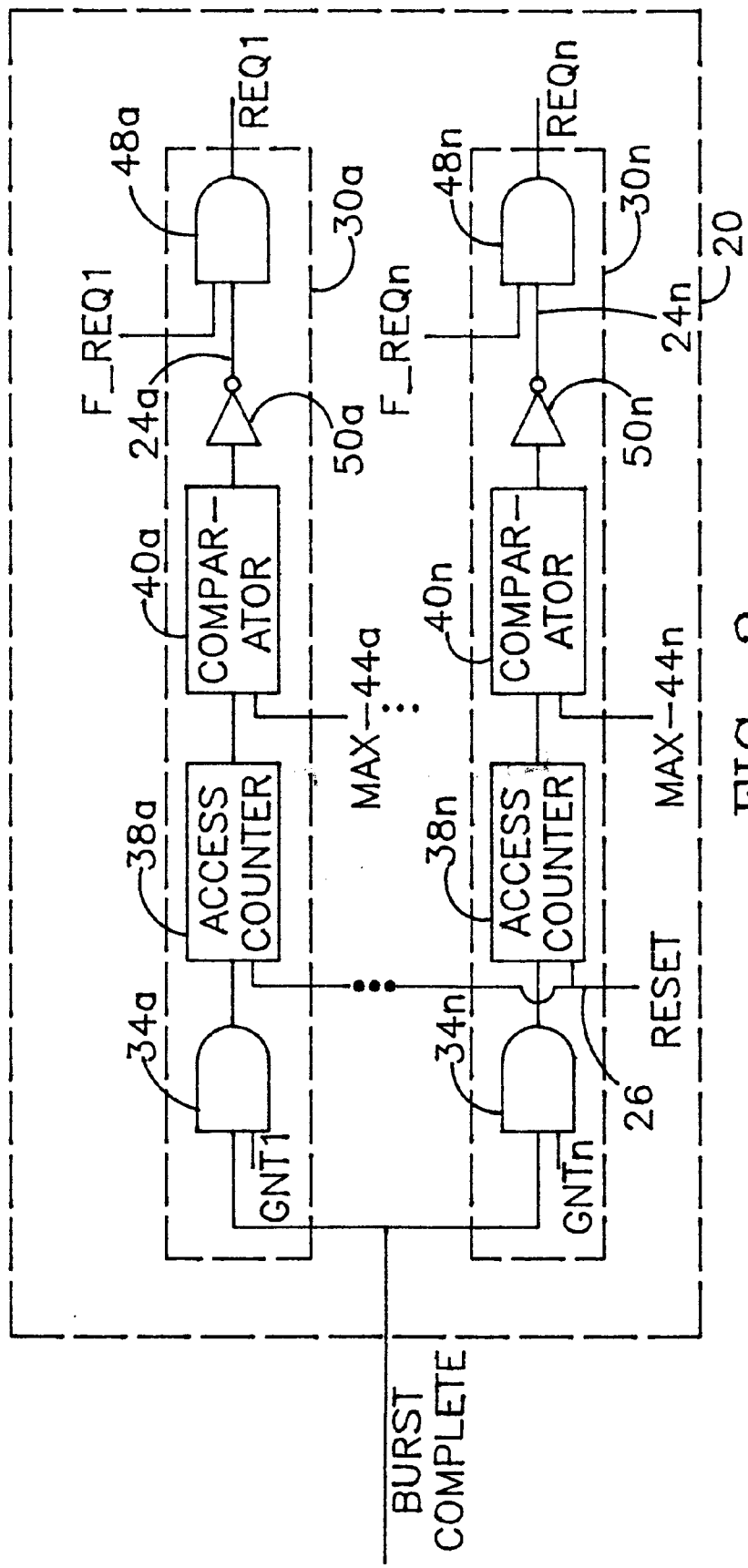
FIG. 2 is a schematic/block diagram of an exemplary implementation of the access arbiter of FIG. 1.

As shown in FIG. 2, access arbiter 20 includes bus request signal generators $30_a$ . . . $30_n$ which correspond to the functions $F_1$ . . . $F_n$. The bus requests for these functions are preferably prioritized in a numerical order with level n being the highest priority interrupt and level 0 being the lowest priority interrupt. As shown in the figure, the burst_complete signal from system bus 14 is provided to one input of each AND gate 34a . . . 34n. The burst_complete signal indicates that a data transfer operation over the system bus has been completed. The other input of each of these AND gates is coupled to the grant signal line from access arbiter 20 for the function corresponding to the bus request signal. The output of each AND gate 34a . . . 34n is coupled to an input for its corresponding access counter 38a . . . 38n. The count contained within each access counter is a bus request disable signal 24a . . . 24n which is provided to its corresponding comparator 40a . . . 40n which also has a second input coupled to a corresponding maximum value 44a . . . 44n. The output of each comparator 40a . . . 40n is provided to an input of its corresponding AND gate 48a . . . 48n through intervening inverters 50a . . . 50n. The remaining input of AND gates 48a . . . 48n is coupled to the corresponding request line, F_REQ1 . . . F_REQn, from the function corresponding to the grant signal, GNT1 . . . GNTn, provided at the input bus request signal generator. Each of the bus request signals generated by bus request signal generators 30a . . . 30n is provided to a priority selector (not shown). The priority selector operates in a known manner to pass the highest priority request signal through to central arbiter 16 as the bus request signal from multi-function device 18. In response to receipt of the grant signal from central arbiter 16, the returned grant signal is provided to the bus request signal generator corresponding to the highest priority level active at the time of its receipt. The signal is also provided to the corresponding function which responds by sending or receiving burst data via system bus 14. When the transfer is complete, the burst_complete signal becomes active.

In more detail, the burst_complete signal going active presents an enabling signal to the input of each AND gate 34a . . . 34n. For the AND gate at which its corresponding grant signal input is active, the AND gate generates an active signal which is provided to its corresponding access counter. This signal causes the access counter to increment the count stored in the counter and the incremented count is provided to its corresponding comparator. The comparator compares the count to a maximum access value and generates a bus request disable signal. The bus request disable signal is inactive if the value in the access counter is less than the predetermined maximum value. Once the access counter value equals the predetermined maximum, the bus request disable signal becomes active. The bus request disable signal is inverted by its corresponding inverter and provided to the input of its corresponding AND gate. This signal is used to either enable or block the bus request signal generated by the corresponding function. Thus, each bus request access signal allows a bus request signal generated by a function to be passed to the priority selector if the maximum number of data transfers for that priority level have not been completed. If the number of completed data transfers equals the predetermined maximum number, then the bus request signal generator is disabled from generating bus request signals which may be provided to the priority selector. In this manner, a higher priority function may be disabled from generating bus request signals once it has received or transmitted its predetermined maximum number of bursts.

In an implementation in which the functions are prioritized, the higher priority functions are serviced first and, as a result, their access counters more quickly reach the predetermined maximum number of data transfers used by comparators $40a \ldots 40n$. However once a bus signal generator reached its maximum number of data transfers, that bus signal generator is disabled and other bus signal generators may acquire the bus. In this implementation, higher priority functions exhaust their maximum of data transfers first, but the lower priority functions are able to queue their function bus request signal. As the request disable signals for higher priority functions become active, the lower priority functions are able to obtain the bus for a number of transfers corresponding to the maximum value in the access counters. Thus, in an environment where all of the functions are actively attempting to access the bus, the functions obtain the bus and perform the maximum number of transfers for function in order of function priority, yet all functions are able to obtain at least some predefined portion of the bus access granted to access arbiter 20.

In a more preferred implementation of the present invention, the maximum values for each bus signal generator $30a \ldots 30n$ differs from the maximum value used for the other bus request signal generators. Most preferably, some functions have maximum values for access counters which are greater than the maximum values for other functions. As a result, the functions with access counters controlled by larger maximum values permit those functions to obtain more of the bandwidth for a bus access granted to access arbiter 20. Thus, this implementation provides a type of prioritized scheme based on bus access bandwidth rather than a predefined priority level. In such an embodiment, all of the bus request signals would be the same priority and the first bus signal generator to assert a bus request would have its bus request provided to central arbiter 16. When central arbiter 16 responded with a grant signal, the function that successfully asserted its bus request signal would transfer data until the bus request disable signal became active. Thereafter, that bus signal generator would remain disabled until the bus signal generators for the other functions completed a number of data transfers equal to the maximum value for the function. In this manner, each function would receive a portion of the bandwidth available to access arbiter 20 in proportion to its corresponding maximum number. If selective modification of bus access for a function is required, the maximum values may be manipulated to alter bus access for a function. For example, rather than modifying a priority level for a function, its maximum value may be altered to increase or decrease the amount of bandwidth available for the function.

In order to allow access arbiter 20 to accept request signals from a function which has reached the maximum number of data transfers, the access counters are reset. To accomplish access counter reset, counters $38a \ldots 38n$ are each provided with a reset line 26 which is asserted by access arbiter 20. Preferably, access counters $38a \ldots 38n$ are reset in response to all of the bus request signals from AND gates $48a \ldots 48n$ being inactive. Thus, if none of the functions are generating a bus request signal, or if all of the access counters have reached their predetermined maximum, access counters $38a \ldots 38n$ are reset to a value which is less than the predetermined maximum. Preferably, access counters $38a \ldots 38n$ are reset to zero.

Using a data transfer count to control bus access helps access arbiter 20 ensure that each function of a multi-function device is able to transfer data regardless of timing constraints imposed by central arbiter 16. For example, a central arbiter for a PCI bus typically includes a latency timer which limits bus access for a device to a predetermined time correlated to an estimated time for a data transfer. In this type of scheme, expiration of the predetermined estimated time results in the termination of the grant signal and correspondingly, the data transfer in progress. Likewise, known arbiters for multi-function devices respond to this termination by terminating the data transfer for the function and arbitrating between the various functions for the next bus access as the function had exhausted its time allocation for data transfer. However, the access arbiter of the present invention does not terminate the data transfer but rather resumes the data transfer once the central arbiter asserts the grant signal to the access arbiter. Thus, the access arbiter of the present invention, for non-prioritized functions, does not permit another function to access the bus until a function either exhausts its number of data transfers or completes a number of data transfers less than the predetermined maximum and then terminates its bus request signal. For prioritized functions, these conditions remain true except a higher priority function with a data transfer count less than its predetermined maximum may gain control of the bus following grant signal termination by central arbiter 16 for a latency timer expiration. In both the prioritized and non-prioritized schemes, access arbiter 20 operates to provide a function with bus access to complete the predetermined number of data transfers regardless of the criteria used by central arbiter 16 for granting bus access.

Figure 3:
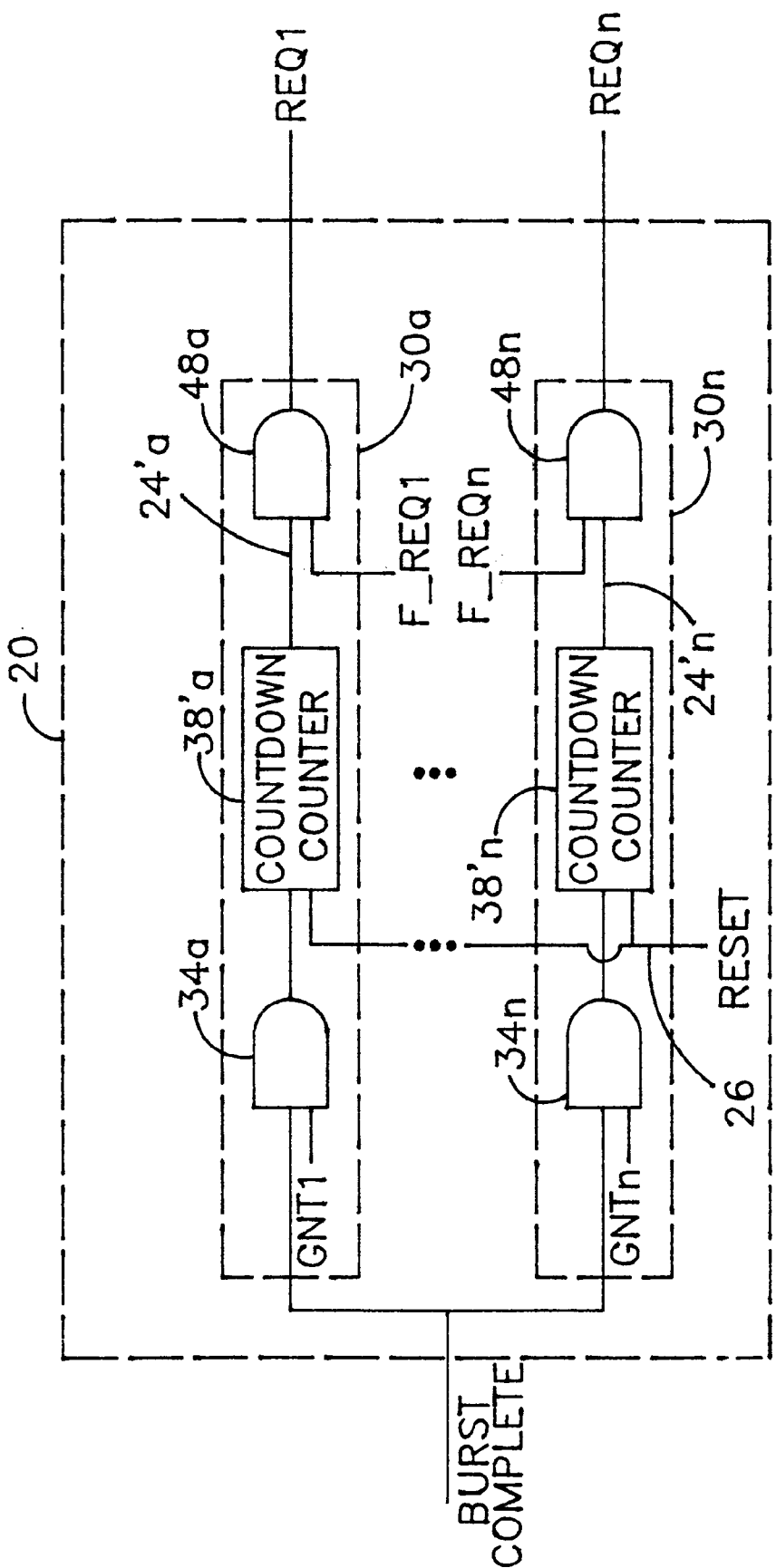
FIG. 3 is a schematic/block diagram of an alternative implementation of the access arbiter of FIG. 1.

An alternative embodiment of the present invention is shown in FIG. 3. Again, burst_complete signal is provided to one input of AND gates $34a \ldots 34n$ of bus signal generators $30a \ldots 30n$. The other input of the AND gates $34a \ldots 34n$ are coupled to the grant signal corresponding to the function which generates a request signal for the bus request generators $30a \ldots 30n$. The output of the AND gates are coupled to the input of access counters $38'a \ldots 38'n$. Access counters $38'a \ldots 38'n$ are countdown counters which are preloaded with the predetermined maximum number of data transfers for the function which corresponds to the bus signal generator. The signal indicating when the countdown counter reaches zero is the bus request disable signal $24a \ldots 24n$ which is provided to one input of AND gate $48a \ldots 48n$. The other input of AND gates $48a \ldots 48n$ are coupled to the bus request lines for the corresponding functions. As long as an access counter for a bus signal generator has not reached zero, a request signal generated by a function is passed by the function signal generator to a priority selector (not shown). In this manner, the interrupts are handled in a prioritized scheme. However, in response to a function transferring data for a number of times equal to the predetermined maximum number, the access counter generates a signal which disables the bus signal generator from passing a bus request signal to the priority selector. Thereafter, other functions may access the bus until no function is generating a bus request or all of the access counters have counted down to zero. At that time, the access counters may be reloaded with the maximum number or a modified maximum number may be used to reload the access counters.

In operation, a multi-function device using access arbiter 20 of the present invention may be coupled to a connector for a system bus. Because access arbiter 20 uses the request/grant pairs of known systems, the inventive device does not affect operation of the system bus. When a function on the multi-function device generates a bus request, it is passed to a priority selector as long as the function has not already transferred data over the system bus for the predetermined maximum number of data transfers. In response to receipt of a grant signal from central arbiter 16, access arbiter 20 enables the requesting function to transfer data over the system bus 14. Following completion of the transfer, the burst_complete signal causes an access count to be incremented and compared to the predetermined maximum number of data transfers. In response to the comparison, a bus request disable signal is generated. If the number of data transfers is less than the predetermined maximum number, the bus request disable signal is inactive. Otherwise, the bus request disable signal is active in the bus signal generator before the function is disabled. Once all of the bus signal generators have been disabled or all of the functions fail to present a bus request signal at the same time, the access counters are reset to a value less than the predetermined maximum and the functions may once again generate bus request signals.

While the present invention is being illustrated with a description of an exemplary and alternative embodiment, and while these embodiments have been described in considerable detail, it is not the intention of the applicant to restrict or in any way limit the scope of the impended claims to such detail. For example, the access arbiter of the present invention may be used with a system bus other than a PCI bus and use signals other than a burst_complete signal to indicate a completed data transfer. Additional advantages or modifications will readily appear to those skilled in the art.

What is claimed is:

1. A method for arbitrating bus requests for a plurality of functions coupled to a system bus, comprising the steps of:

allocating a first predetermined maximum number of completed data transfers to a first function of the plurality of functions coupled to the system bus;

receiving a first request for access to the system bus from the first function of the plurality of functions;

granting the first function of the plurality of functions access to the system bus based upon a first completed number of data transfers for the first function indicating that the first function has yet to complete the first predetermined maximum number of completed data transfers;

transferring first data between the first function and the system bus in response to the first function granting step;

receiving a first data transfer complete signal in response to completing the first data transferring step;

updating the first completed number of data transfers for the first function in response to receiving the first data transfer complete signal; and preventing the first function access to the system bus in response to the first completed number of data transfers for the first function indicating that the first function has completed the first predetermined maximum number of completed data transfers so that other functions of the plurality of functions may obtain access to the system bus.

2. The method of claim 1, wherein the first function granting step further comprises the steps of:

comparing the first completed number of data transfers for the first function to the first predetermined maximum number of completed data transfers allocated to the first function, and generating a first grant signal that grants the first function access to the system bus only if the comparing step determines that the first completed number of data transfers is less than the first predetermined maximum number of completed data transfers.

3. The method of claim 2, further comprising the step of:

resetting the first completed number of data transfers to a number less than the predetermined maximum number in response to none of the functions of the plurality of functions generating a corresponding bus request signal.

4. The method of claim 1, further comprising the steps of:

allocating a second predetermined maximum number of completed data transfers to a second function of the plurality of functions;

receiving a second request for access to the system bus from the second function of the plurality of functions and a third request for access to the system bus from the first function after said updating step;

determining that said first function has complete only a portion of the first predetermined number of data transfers and said second function has yet to complete said second predetermined number of data transfers; and granting the second function of the plurality of functions access to the system bus.

5. The method of claim 4, wherein:

the first allocating step comprises the step of allocating the first predetermined maximum number of completed data transfers based upon a first priority level for the first function, and the second allocating step comprises the step of allocating the second predetermined maximum number of completed data transfers based upon a second priority level for the second function.

6. The method of claim 1, further comprising the step of:

modifying the first predetermined maximum number of completed data transfers in order to alter a first amount of bus access bandwidth allocated to the first function.

7. The method of claim 1, wherein:

said first function granting step further comprises the step of granting the first function access to the system bus based further upon a first priority level for the first function and priority levels for each function of the plurality of functions that is currently requesting access to the system bus.

8. A central arbiter for arbitrating requests received from a plurality of functions, comprising:

a bus request generator operable to (i) allocate a separate maximum number of completed data transfers to each function of the plurality of functions, (ii) receive a separate request signal from each function of the plurality of functions, and (iii) generate a separate bus request signal for each request signal received from function of the plurality of functions that has yet to complete the separate maximum number of completed data transfers allocated to the respective function; and a selector coupled to the bus request generator and operable to (i) receive each bus request signal generated by the bus request generator, and (ii) grant a function of the plurality of functions access to the system based upon each bus request signal received from the bus request generator.

9. The central arbiter of claim 8, wherein said bus request generator, comprises:

an access counter associated with a first function of the plurality of functions and operable to store a first value indicative of a first number of data transfers that the first function has completed; and a comparator coupled to said access counter and operable to generate a bus request disable signal that prevents the selector from receiving the bus request signal associated with the first function in response to the value stored in the access counter indicating that the first function has already completed the maximum number of completed data transfers allocated to the first function.

10. The central arbiter of claim 9, wherein:

said access counter is operable to receive a data transfer complete signal in response to the first function completing a data transfer, and update the value in response to receiving the data transfer complete signal in order to maintain the value equal to the number of data transfers that the first function has completed.

11. The central arbiter of claim 10, wherein:

said comparator is operable to generate the bus request disable signal in response to the value stored within the access counter being equal to the maximum number of data transfers allocated to the first function.

12. The central arbiter of claim 9, wherein:

said bus request generator comprises a countdown counter that implements said access counter and said comparator.

13. The central arbiter of claim 9, wherein:

said comparator comprises an input operable to receive the maximum number of data transfers allocated to the first function.

14. The central arbiter of claim 8, wherein:

said bus request generator is further operable to (v) modify the maximum number of completed data transfers allocated to at least one function the plurality of functions in order to alter an amount of bus access bandwidth allocated to said at least one function.

15. A method for arbitrating bus requests of a plurality of functions coupled to a system bus, comprising the steps of:

transferring first data between a function of the plurality of functions and the system bus;

receiving a first data transfer complete signal in response to completing the first data transferring step;

updating a completed number of data transfers for the function in response to receiving the first data transfer complete signal;

comparing the completed number of data transfers for the function to a predetermined maximum number of completed data transfers for the function;

disabling bus requests from the function by generating a bus request disable signal in response to the comparing step indicating that the completed number of data transfers is greater than the predetermined maximum number of completed data transfers;

generating a bus request signal in response to the function requesting access to the system bus if the disabling step does not generate the bus request disable signal; and granting the function access to the system bus based upon the bus request signal.

16. The method of claim 15, further comprising the steps of:

resetting the completed number of data transfers to a number less than the predetermined maximum number in response to none of the functions of the plurality of functions generating a corresponding bus request signal.

17. The method of claim 15, further comprising the step of:

allocating each function of the plurality of functions a separate predetermined maximum number of completed data transfers such that the predetermined maximum number of completed data transfers allocated to the function is different than the predetermined maximum number of completed data transfers allocated to the other functions.

18. The method of claim 15, further comprising the step of:

allocating each function of the plurality of functions a separate predetermined maximum number of completed data transfers that corresponds to a priority level for each function.

19. The method of claim 15, further comprising the step of:

modifying the predetermined maximum number of completed data transfers in order to alter an amount of bus access bandwidth allocated to the function.

20. The method of claim 15, wherein:

the granting step further comprises the step of granting the function access to the system bus based further upon a priority level for the function and priority levels for each function of the plurality of functions that is currently requesting access to the system bus.

* * * * *